United States Patent
Du

(10) Patent No.: US 8,200,253 B2
(45) Date of Patent: Jun. 12, 2012

(54) METHOD FOR NOTIFYING A TERMINAL OF AN UPDATE ON SYSTEM INFORMATION IN A LONG TERM EVOLUTION SYSTEM

(75) Inventor: Zhongda Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 26 days.

(21) Appl. No.: 12/746,511

(22) PCT Filed: Aug. 1, 2008

(86) PCT No.: PCT/CN2008/071852
§ 371 (c)(1),
(2), (4) Date: Jun. 4, 2010

(87) PCT Pub. No.: WO2009/076807
PCT Pub. Date: Jun. 25, 2009

(65) Prior Publication Data
US 2010/0267366 A1     Oct. 21, 2010

(30) Foreign Application Priority Data
Dec. 12, 2007   (WO) ............... PCT/CN2007/003569

(51) Int. Cl.
*H04W 68/00*        (2009.01)
(52) U.S. Cl. ............... 455/458; 455/434; 455/435.1
(58) Field of Classification Search ............... 455/412.2, 455/574, 515, 434, 458, 435.1
See application file for complete search history.

(56) References Cited

U.S. PATENT DOCUMENTS

| 8,135,435 B2* | 3/2012 | Somasundaram et al. . 455/552.1 |
| 2005/0164683 A1 | 7/2005 | Roberts et al. |
| 2005/0176474 A1* | 8/2005 | Lee et al. ............ 455/574 |
| 2005/0195852 A1* | 9/2005 | Vayanos et al. ............ 370/437 |
| 2006/0171358 A1 | 8/2006 | Kangas et al. |
| 2009/0124245 A1* | 5/2009 | Somasundaram et al. .... 455/418 |

(Continued)

FOREIGN PATENT DOCUMENTS

CN       1820433 A       8/2006

(Continued)

OTHER PUBLICATIONS

International Search Report in international application No. PCT/CN2008/071852, mailed Oct. 30, 2008.
English Translation of the Written Opinion of the International Search Authority in international application No. PCT/CN2008/071852, mailed on Oct. 30, 2008.

(Continued)

*Primary Examiner* — Barry Taylor
(74) *Attorney, Agent, or Firm* — Oppedahl Patent Law Firm LLC

(57) ABSTRACT

A method for notifying a terminal of an update on system information in a long term evolution system, which is used for notifying the terminal after the system information changes by a network side, after the system information changes, the network side notifies the terminal that the system information has changed within the system information modification period, wherein the length of the system information modification period is an integer multiple of discontinuous reception (DRX) period, and the DRX period is a period that the terminal receives paging message in the idle status. By using the method of the present invention, because the system information modification period is specified as an integer multiple of the DRX period, it makes sure that each terminal in the RRC_IDLE state receives the paging message including update information of the system information at least once.

11 Claims, 5 Drawing Sheets

U.S. PATENT DOCUMENTS

2010/0165901 A1* 7/2010 Kim .............................. 370/312

FOREIGN PATENT DOCUMENTS

| CN | 1947449 | A | 4/2007 |
| CN | 101043671 | A | 9/2007 |
| CN | 101043721 | A | 9/2007 |
| CN | 101043734 | A | 9/2007 |
| WO | 2006079879 | A1 | 8/2006 |
| WO | 2007073079 | A1 | 6/2007 |

OTHER PUBLICATIONS

International Search Report in international application No. PCT/CN2007/003569, mailed Sep. 25, 2008.

English Translation of the Written Opinion of the International Search Authority in international application No. PCT/CN2007/003569, mailed on Sep. 25, 2008.

* cited by examiner

METHOD FOR NOTIFYING A TERMINAL OF AN UPDATE ON SYSTEM INFORMATION IN A LONG TERM EVOLUTION SYSTEM

RELATED APPLICATIONS

This Application is a National Phase of International Application No. PCT/CN2008/071852, entitled "A METHOD FOR NOTIFYING UE ABOUT UPDATING OF SYSTEM INFORMATION IN LONG TERM EVOLUTION PLANNING SYSTEM", which was filed on Aug. 1, 2008, and which claims priority of Chinese PCT Application No. PCT/CN2007/003569, filed on Dec. 12, 2007.

TECHNICAL FIELD

The present invention relates to the filed of communication technologies, and particularly to a method for a network side to notify a terminal of an update on system information after the system information is updated in a Long Term Evolution (LTE) system.

BACKGROUND

The 3GPP (Third Generation Partnership Project) LTE is a system that copes with requirements of future communications, as shown in FIG. 1, the LTE system is primarily composed of a terminal, base stations and a core network. Wherein, the network which is composed of the base stations is called a Radio Access Network (RAN), which is responsible for access stratum affairs, such as radio resource management. Physical or logical connections may exist among the base stations according to actual situations, such as between base station 1 and base station 2 or base station 3 as shown in FIG. 1. Each base station may be connected with one or more core network (CN) nodes. The core network is responsible for non-access stratum affairs, such as location updating, etc., and moreover, for updating the anchor point on the user side. The terminal refers to all kinds of devices that can communicate with a cellular radio communication network, such as mobile phones or laptop computers, etc.

A basic unit of system time in the LTE system is a radio frame. The length of the radio frame is 10 milliseconds (ms), one radio frame contains 10 subframes, and the length of each subframe is 1 ms. System information is the information used to broadcast system configuration parameters. As classified according to functions in the LTE, the system information primarily includes a master system information block (MIB), scheduling information block 1 (SU-1 for short), and other scheduling information blocks (SU-X for short hereinafter). Wherein:

the MIB includes some physical layer parameters and a system frame number SFN;

the SU-1 includes scheduling information of other SU-Xs, an public land mobile network list (PLMN LIST), a cell ID, access control parameters and a system information tag (value tag), etc;

each SU-X may include one or more system information blocks (SIB), in other words, the system information blocks mapped to a same SU-X share a same scheduling rule in a time domain; and when a network starts to broadcast new system information, the value tag on the SU-1 will be updated.

The MIB is broadcasted over a system broadcast channel (e.g. PBCH), and resource configuration of the PBCH in the time domain and frequency domain is static. The scheduling period of the MIB is fixed, i.e. its contents are repeated once every 40 ms. The MIB always resides in subframe #0 of the radio frame where it is located. The SU-1 and SU-X are carried by a downlink shared channel. The scheduling period of the SU-1 is also fixed, i.e. it is scheduled once every 80 ms, and it is allowed to be retransmitted up to 4 times within 80 ms, the SU-1 occupies one subframe, and the position of the subframe in the radio frame where the SU-1 resides is also fixed. The system information blocks broadcasted in a subframe are carried on system's radio resources, and control parameters related to these radio resources, such as modulation and coding scheme (MCS), and transmission formats, etc, are provided by the following dedicated control channel (e.g. PDCCH), i.e. a dynamic scheduling method is adopted.

The sequence that a user Equipment (UE) reads the system information is first reading the MIB, then reading contents of the SU-1, from the SU-1 the user equipment may obtain scheduling information of other SU-Xs, thus read contents of the system information blocks (SIB) in these SU-Xs.

In the LTE, a radio access stratum (e.g. RRC) has two states: an idle state (RRC_IDLE) and a connected state (RRC_CONNECTED):

if the contents of the system information have changed, then the network will notify the terminal through a paging message, and then the terminal will be triggered to re-read the contents of the system information. For an easy description, in the present invention, the period that the terminal receives the paging message under the RRC_IDLE state is called a DRX (Discontinuous Reception) period.

A notification message about an update on system information shown in FIG. 2 is a paging message.

No matter which state the terminal is in, suppose that a system frame number of the notification message about an update on the system information received by the terminal from the system is SFN, then the terminal will consider that the system information will be updated after the N-SFN % N frame, the N corresponds to the length of a system information modification period, i.e. standing for the number of frames occupied by the modification period.

In the current LTE system, there is no specific prescription for defining the system information modification period.

SUMMARY

The technical problem that the present invention intends to resolve is to provide a method for system information notification in an LTE system so that when the system information changes, a network side will notify a terminal that the system information has already changed, thus facilitating the terminal to receive updated the system information in time.

In order to resolve the above mentioned technical problem, the present invention provides a method for notifying a terminal of an update on system information in an LTE system, which is used for a network side to notify a terminal after the system information changes; after the system information changes, the network side notifies the terminal of the change of the system information within a system information modification period, wherein:

the length of the system information modification period is an integer multiple of a discontinuous reception (DRX) period, and the DRX period is a period that the terminal receives a paging message in an idle state.

Furthermore, the method may be also characterized in that, the system information modification period is notified to the terminal by the network side of the system through system information broadcasting.

Furthermore, the method may be also characterized in that, the DRX period is notified to the terminal by the network side of the system through system information broadcasting.

Furthermore, the method may be also characterized in that, when contents of the system information changes, the network side notifies the terminal through the paging message within the system information modification period.

Furthermore, the method may be also characterized in that, the system information modification period is a system frame cycle period.

Furthermore, the method may be also characterized in that, the system information modification period is 10240 ms, and a system frame number of the boundary of the system information modification period is exactly divisible by 1024.

It can be guaranteed, by using the method disclosed in the present invention, that each terminal in the RRC_IDLE state receives the paging message including update information of the system information at least once because the system information modification period is specified as an integer multiple of the DRX period, and the multiple retransmission of the paging message within the period can improve the reliability of the terminal receiving the paging message.

DETAILED DESCRIPTION

The following provides detailed descriptions of the technical scheme of the present invention according to the preferred embodiments of the present invention and attached drawings.

After system information changes, a network side notifies a terminal of the change of the system information within a system information modification period, wherein, the length of the system information modification period is an integer multiple of a DRX period, and the DRX period is a period that the terminal receives a paging message in an idle state.

The system information modification period is notified to the terminal by the network side of the system through system information broadcasting. The DRX period is notified to the terminal by the network side of the system through system information broadcasting.

Embodiment 1: it is an embodiment in which the system information modification period is two times the DRX period.

Figure 1:
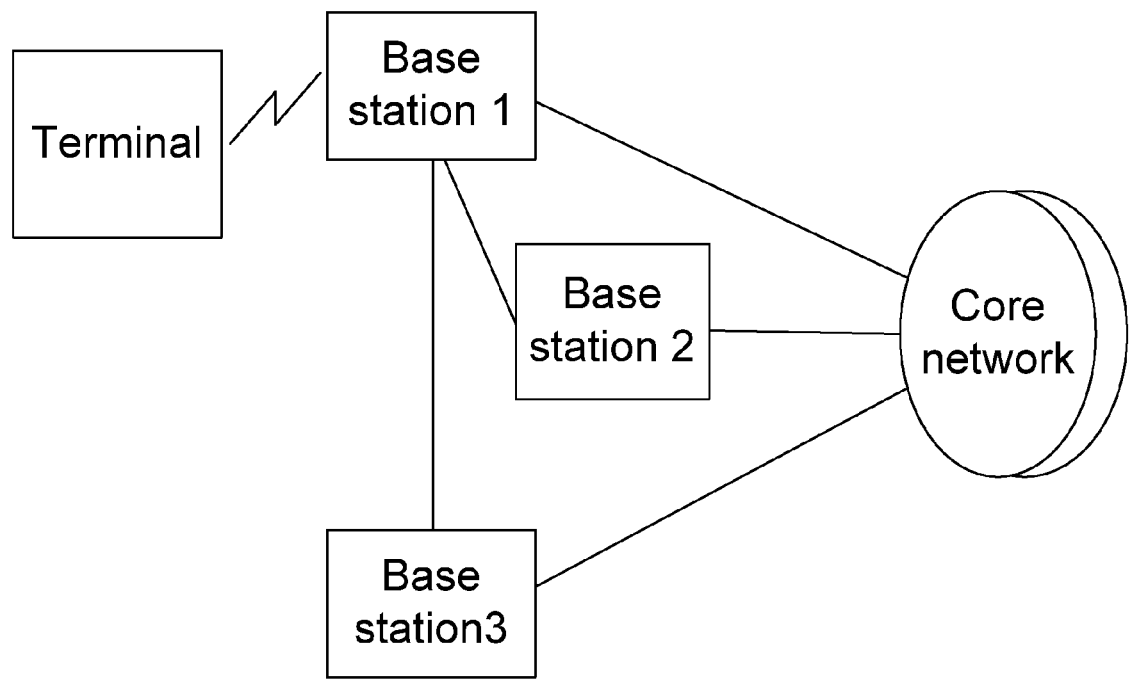
FIG. 1 is a diagram of a network structure of an LTE system.
Figure 2:
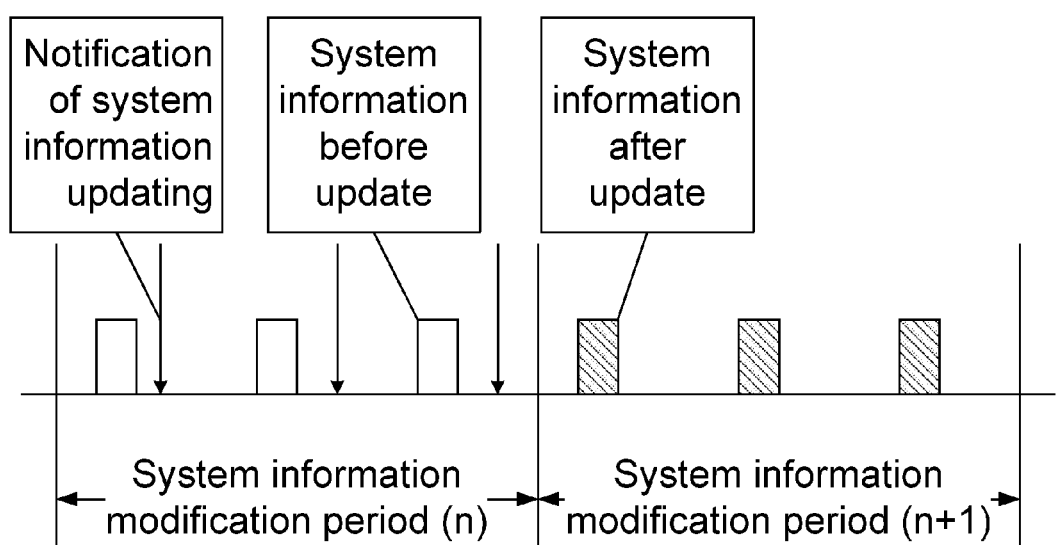
FIG. 2 is a diagram of an existing notification of system information updating in the background technology.
Figure 3:
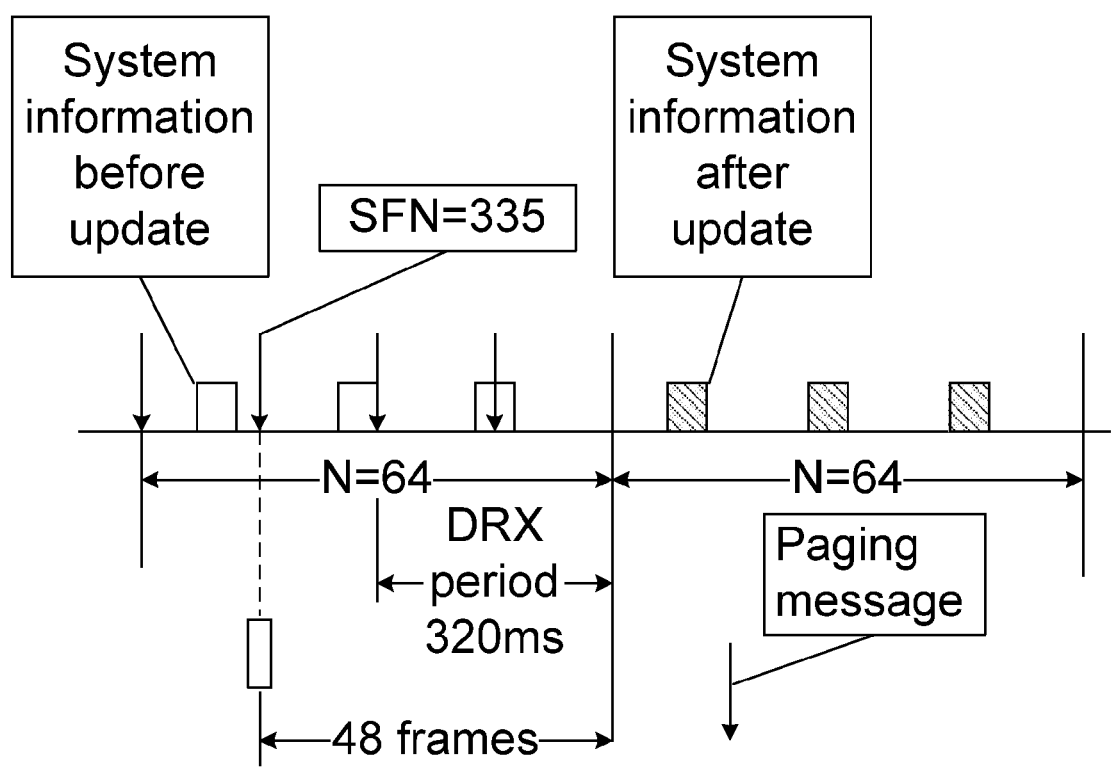
FIG. 3 is a diagram of a system information modification period that is two times a DRX period in an embodiment of the present invention.

According to FIG. 3, suppose that the DRX period is 320 ms when the terminal is in the RRC_IDLE state, then the system information modification period is specified as 640 ms (64 radio frames), i.e. equal to two times the DRX period in the RRC_IDLE state. Moreover, the boundary of the system information modification period is specified to fulfill the condition of SFN % 64=0, i.e. a system frame number of the boundary of the system information modification period is exactly divisible by 64, and the system frame number of the boundary of the system information modification period refers to the system frame number to which a start point and an end point of the system information modification period correspond.

Suppose that the terminal receives a notification message about an update on system information in the frame whose system frame number is SFN=335, then after 48 frames, the terminal will start to read the contents of the updated system information.

Embodiment 2: it is an embodiment in which the system information modification period is one time the DRX period.

Figure 4:
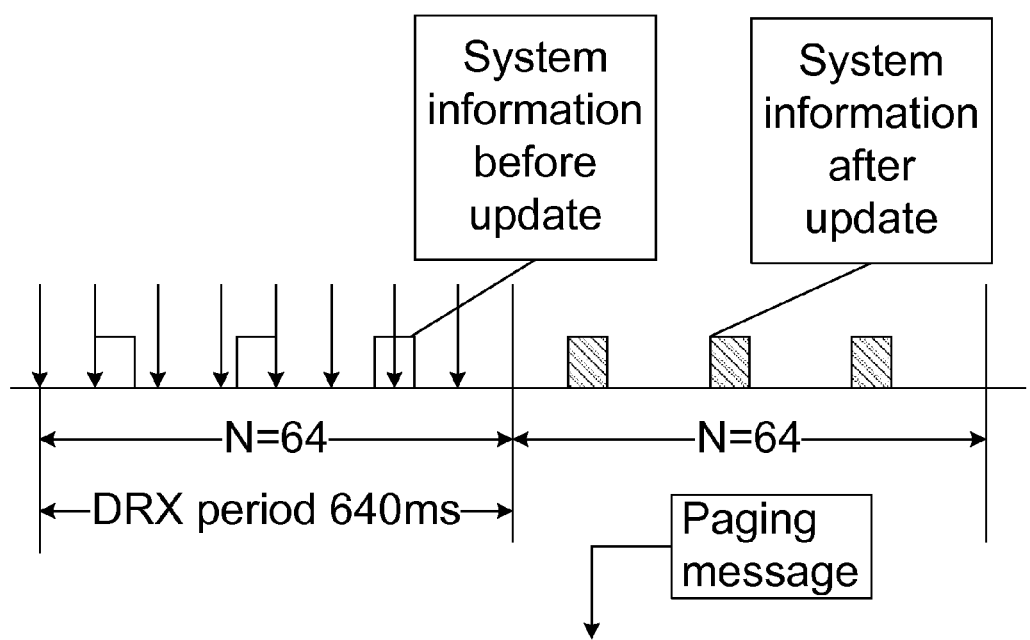
FIG. 4 is a diagram of a system information modification period that is one time a DRX period in an embodiment of the present invention.

According to FIG. 4, suppose that the DRX period is 640 ms (i.e. 64 radio frames) when the terminal is in the RRC_IDLE state, then the system information modification period is also specified as 640 ms, i.e. equal to the DRX period in the RRC_IDLE state. Moreover, the boundary of the system information modification period is specified to fulfill the condition of SFN % 64=0, i.e. requiring that a frame number can be exactly divisible by 64, with a remainder being 0. Suppose that there are 8 paging opportunities during the DRX period, then a base station will send the system information 8 times to notify the terminal that the system information has changed.

Embodiment 3: the system information modification period is 10.24 s, i.e. one system frame cycle period.

Figure 5:
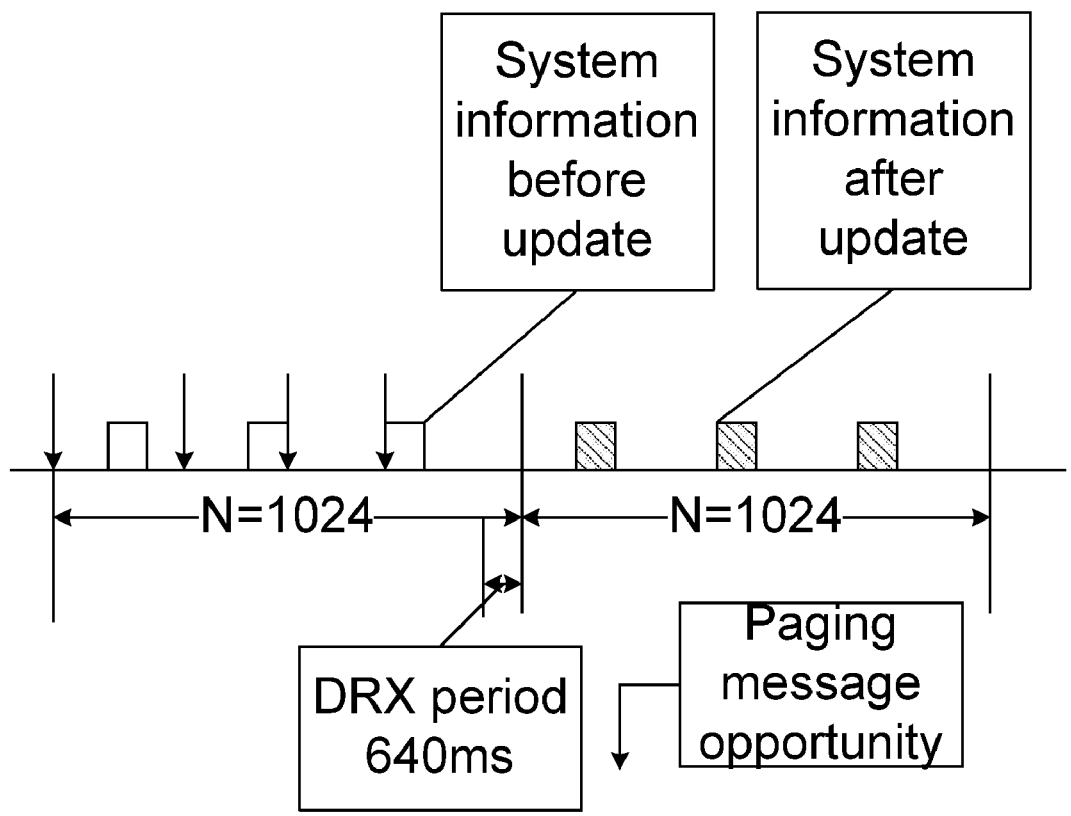
FIG. 5 is a diagram of a system information modification period that is one system frame period in an embodiment of the present invention.

According to FIG. 5, suppose that the DRX period is 640 ms (i.e. 64 radio frames) when the terminal is in the RRC_IDLE state, then the system information modification period is specified as 10240 ms, i.e. equal to 16 times the DRX period in the RRC_IDLE state. Moreover, the boundary of the system information modification period is specified to fulfill the condition of SFN % 1024=0, i.e. one system frame cycle period.

INDUSTRIAL APPLICABILITY

The present invention is applicable to the field of mobile communication technologies, particularly to an LTE system in the Third Generation Partnership Project (3GPP), which is used to notify a terminal of a change of system information after the system information has changed. By making use of the present invention, it can be guaranteed that each terminal in an idle state receives a paging message including update information of the system information at least once.

What is claimed is:

1. A method for notifying a terminal of an update on system information in a long term evolution system, which is used for a network side to notify a terminal after the system information changes:

after the system information changes, the network side notifying the terminal of the change of the system information within a system information modification period, wherein:

the length of the system information modification period is an integer multiple of a discontinuous reception DRX period, and the DRX period is a period that the terminal receives a paging message in an idle state;

the system information modification period is a system frame cycle period, and the system information modification period is 640 ms, and a system frame number of the boundary of the system information modification period is exactly divisible by 64.

2. The method according to claim 1, wherein:

the system information modification period is notified to the terminal by the network side of the system through system information broadcasting.

3. The method according to claim 2, wherein:
when contents of the system information changes, the network side notifies the terminal through the paging message within the system information modification period.

4. The method according to claim 1, wherein:
the DRX period is notified to the terminal by the network side of the system through system information broadcasting.

5. The method according to claim 1, wherein:
when contents of the system information changes, the network side notifies the terminal through the paging message within the system information modification period.

6. The method according to claim 1, wherein:
the length of the system information modification period is 1, 2, or 16 times of the length of the DRX period.

7. A method for notifying a terminal of an update on system information in a long term evolution system, which is used for a network side to notify a terminal after the system information changes:
after the system information changes, the network side notifying the terminal of the change of the system information within a system information modification period, wherein:
the length of the system information modification period is an integer multiple of a discontinuous reception DRX period, and the DRX period is a period that the terminal receives a paging message in an idle state;
the system information modification period is a system frame cycle period, and the system information modification period is 10240 ms, and a system frame number of the boundary of the system information modification period is exactly divisible by 1024; the length of the system information modification period is 1, 2, or 16 times of the length of the DRX period.

8. The method according to claim 7, wherein:
the system information modification period is notified to the terminal by the network side of the system through system information broadcasting.

9. The method according to claim 8, wherein:
when contents of the system information changes, the network side notifies the terminal through the paging message within the system information modification period.

10. The method according to claim 7, wherein:
the DRX period is notified to the terminal by the network side of the system through system information broadcasting.

11. The method according to claim 7, wherein:
when contents of the system information changes, the network side notifies the terminal through the paging message within the system information modification period.

* * * * *